United States Patent
Selvin et al.

(10) Patent No.: US 6,718,329 B1
(45) Date of Patent: Apr. 6, 2004

(54) METHOD AND APPARATUS FOR GENERATING TYPED NODES AND LINKS IN A HYPERTEXT DATABASE FROM FORMATION DOCUMENTS

(75) Inventors: Albert Michael Selvin, Pawling, NY (US); Maarten Sierhuis, Fremont, CA (US)

(73) Assignee: Verizon New York Inc., New York, NY (US)

( * ) Notice: Subject to any disclaimer, the term of this patent is extended or adjusted under 35 U.S.C. 154(b) by 0 days.

(21) Appl. No.: 09/116,702

(22) Filed: Jul. 16, 1998

(51) Int. Cl.$^7$ ............................................. G06F 17/30
(52) U.S. Cl. ..................... 707/10; 707/102; 715/531
(58) Field of Search .................. 707/1–10, 100–104.1, 707/513; 711/117, 129; 709/203; 715/501, 531

(56) References Cited

U.S. PATENT DOCUMENTS

| | | | |
|---|---|---|---|
| 5,557,722 A | * 9/1996 | DeRose et al. | 707/513 |
| 5,564,046 A | 10/1996 | Nemoto et al. | 707/102 |
| 5,630,117 A | * 5/1997 | Oren et al. | 707/100 |
| 5,634,121 A | 5/1997 | Tracz et al. | 707/102 |
| 5,708,806 A | * 1/1998 | DeRose et al. | 707/104.1 |
| 5,708,825 A | * 1/1998 | Sotomayor | 715/501.1 |
| 5,905,979 A | * 5/1999 | Barrows | 707/1 |
| 5,963,205 A | * 10/1999 | Sotomayor | 707/531 |
| 6,014,135 A | * 1/2000 | Fernandes | 345/331 |
| 6,101,512 A | * 8/2000 | DeRose et al. | 707/514 |
| 6,105,044 A | * 8/2000 | DeRose et al. | 707/514 |

OTHER PUBLICATIONS

Albert M. Selvin; Leveraging Existing Hypert Functionality to Create a Customized Environment for team Analysis, Mar. 1996.*

Selvin, Albert M., "Levergaing Existing Hypertext Functionality to Create a Customized Environment for Team Analysis" appeared on the Internet at URL: http://space.njit.edu:5080/HTFII/Selvin.html and/or http://www.ep.cs.nott.ac.uk/~hla/HTF/HTFII/Selvin.html on or about Mar. 1, 1996.

* cited by examiner

Primary Examiner—Jean M. Corrielus
Assistant Examiner—Jean Bolte Fleurantin
(74) Attorney, Agent, or Firm—Leonard C. Suchyta, Esq.; John Yankovich, Esq.

(57) ABSTRACT

The present invention is a method and apparatus for generating nodes and link definitions for a hypertext database from at least one source document which includes text and formatted properties that define a logical structure of the source document. Initially, the source document is segmented according to selected formatted properties. A node is then generated for each segment of the source document. Thereafter, link definitions are created to establish associations between the nodes so as to maintain the logical structure of the source document defined by the format properties. The nodes and link definitions can be imported to a hypertext database and searched with a hypertext engine.

42 Claims, 10 Drawing Sheets

METHOD AND APPARATUS FOR GENERATING TYPED NODES AND LINKS IN A HYPERTEXT DATABASE FROM FORMATION DOCUMENTS

FIELD OF THE INVENTION

The present invention relates to the generation of a hypertext database for use on a hypertext platform and, more specifically, to the generation of typed nodes and links in a hypertext database from formatted documents.

BACKGROUND OF THE INVENTION

In many industries, models are employed to solve complex problem domains, such as designing of a business process, designing products and so forth. The creation of a model includes various elements, other than the work of actually populating the model elements. Much of the group work that occurs in a model-building effort consists of discussion, argument, brainstorming, and other informal communication about the models. This includes conversations about what to place in the model, what issues are raised by the model, what work needs to be done in connection with the model, how does the model relate to other aspects of the project, and so forth.

Currently, most modeling tools do not include support for these activities and, more significantly, do not provide any way of recording, displaying, or maintaining these discussions as part of an overall modeling representation. One significant problem is that modeling and conversation are seen as, and supported as, separate activities requiring separate tools. This has negative implications for development of group understanding of both the models and the problem domain; the communicative ability of both the project team as a whole and the team's individual members; the storing of rationale for key decisions about model elements, model construction, project management, and design elements; and other areas of a project.

There is a need to provide generally a tool which improves intercommunication between project members. There is also a need to provide a tool which can consolidate such intercommunication and other relevant information into a searchable database, capable of being created and utilized by those with little or no software development experience.

One possible approach to remedy the above problem is to employ the logical infrastructure or associations provided by a hypertext system. One technique in generating a database employed in a hypertext system (hereinafter "hypertext database") involves the user creating data which serve as nodes for each unit of data and setting each link one by one depending on the relationship between the created nodes. Another technique requires that the user creates one datum corresponding to each node and directly manages (e.g., non-automatic) the hypertext creation of the created datum to achieve the division of the datum into nodes and the creation of links between the divided nodes.

However, such hypertext approaches, as described above, do not provide an architecture or infrastructure suitable for facilitating intercommunication between project members. That is, they do not provide the flexibility to consolidate data having a format generated from various sources or application programs, to generate a useful, searchable, logical hypertext representation thereof. More importantly, they do not provide a simple and efficient method to create automatically customized nodes and links, which maintain the attributes and relationships of the original data (e.g., documents). As such, the above hypertext approaches provide an inadequate hypertext representation.

Accordingly, an object of the present invention is to provide an apparatus and method for generating a free-form, multi-dimensional, searchable hypertext database, from non-hypertext data, such as documents, WEB pages, tables, charts, etc.

It is a further object of the present invention to provide a method and apparatus for generating the above hypertext database without requiring programming skills or excessive administration in the generation and modification of the source document.

It is also an object of the present invention to generate a searchable hypertext database from documents generated by non-hypertext applications such as MS Word™.

Another object of the present invention is to utilize available functions and commands in conventional application programs used to generate source documents to facilitate the generation of a hypertext database.

It is also an object of the present invention to provide a method and apparatus for generating a hypertext database from source documents generated at various locations and with different application programs.

SUMMARY OF THE INVENTION

The present invention is a method and apparatus for generating nodes and link definitions for a hypertext database from at least one source document which includes text and formatted properties that define a logical or semantic structure of the source document or, more specifically the attributes and relationships of the information in the source document. Initially, the source document is segmented according to selected formatted properties. A node is then generated for each segment of the source document. Thereafter, link definitions are created to establish associations between the nodes so as to maintain the logical or semantic structure of the source document defined by the format properties. The nodes and link definitions can be imported to a hypertext database and searched with a hypertext engine.

The present invention provides a method and apparatus that converts a source document into a hypertext format by analyzing the inherent format properties, i.e., format codes, of the source document. Thus, source documents can be generated at various locations using different application programs (e.g., different word processing application programs, spreadsheet application programs, etc.) and be converted and integrated into a single searchable hypertext database. Such an arrangement provides a flexible and useful tool, which is capable of aggregating information from various sources into a logically searchable hypertext database.

The present invention also provides a method and apparatus in which the nodes can be customized with fields that specify specific characteristics of their corresponding segments of the source document. For instance, each node may include a LABEL, CONTENT and NODE TYPE field where the LABEL field contains the content (e.g., text) delimited by length or format codes or key commands, the CONTENT field contains the format codes or key commands and the remaining content (if any) of the corresponding segment of the source document and the NODE TYPE field refers to the style defined by the format codes or key commands and contains information associated with the style and/or levels, e.g., an Issue or a Position. It is important to understand that the information in each field is determined based on the format properties of the corresponding segment. For example, the NODE TYPE field contains the term "Issue" if the segment is a heading (i.e., contains heading format code(s)) or the term "Position" if the segment is not a heading.

The present invention further provides a method for creating logical associations (link or link definitions) between the generated customized nodes that retain the logical or hierarchical relationship of the content of the source documents. That is, the customized nodes are linked according to the logical or hierarchical structure defined by the format codes so that a user can search and/or browse the nodes as if the user is reading through the source document. Moreover, the present invention allows the links to be further defined according to a type of the links ("Link-Type"), such as "About" or "Specializes". The Link-type identifies a semantic relationship between the content of the linked nodes.

For instance, a link-type such as "Specializes" may generally indicate that the content of a node is a subtopic of the information of another node. A link-type such as "About" may generally indicate that the content of a node explains the subject matter of another node. Other link-types may be employed depending on the desired search parameters, the relationships or information sought to be identified, and so forth. Such an arrangement allows the relationship between linked nodes to be further defined, thereby providing a logical, searchable hypertext database.

The present invention also provides a method by which a user, such as a team project member, can utilize conventional functions found in application programs (which can generate a source document) to encode a source document with user key commands. User key commands can be predefined or selected text character(s) or symbol(s), or predefined or selected format codes which are used to provide further detail and structure to the source document, particularly for use when the source document is converted to nodes. That is, the information inserted into the nodes are defined by the particular key commands, e.g., the highlighted or bolded content (or a portion thereof) of a segment is copied to the LABEL field with the key commands and remaining content being copied to the CONTENT field. In this way, the already existent functionality of application programs can be used to enhance the creation of nodes and link definitions of a hypertext database. This is a particularly useful tool, since the information from source documents with user key commands can be converted to a more detailed and useful node (with fields) representation of the information.

DETAILED DESCRIPTION OF THE INVENTION

Before proceeding with a detailed description of the invention, it is well to define certain terms and concepts. A "source document" hereafter will refer to data or a data file, such as a document (e.g., memos, letters, articles, etc.), table, spreadsheet, chart, HTML WEB page, or any data file having data in a text format. A source document may also include graphical data, such as in a HTML WEB page. The source document can be generated and edited using various known application programs, such as word-processing programs (e.g., Microsoft™ Word, WordPerfect™), spreadsheet programs (e.g., Microsoft EXCEL), CAD programs, WEB PAGE generators or tools or any other application program capable of generating at least text. The term "application program" will hereinafter generally refer to programs that can be used to generate and edit source documents.

Source documents as described herein have inherent format properties that define a logical structure or organization of the document, specifically the logical structure of the content, such as text and graphical data. Format properties refer to format codes (or style) that are embedded in the source document to define the logical structure of the document. Such format properties or codes may include a: heading format code, subheading format code, paragraph format code, bold format code, italic format code, underline format code, font type format code, font size format code, table format code, chart format code or any other type of format code that defines a logical structure or representation of the source document. The specific format codes and encoding thereof in a source document are dependent on the particular application program utilized to generate the source document. These may include ASCII format, Rich Text Format (RTF), Microsoft WORD format, WordPerfect format and other known formats. A source document can be generated using a template, which allows the document to be pre-formatted with desired format codes. It is important to distinguish format properties or codes of a source document from the content, e.g., the textual content, of the source document.

The term "node" refers generally to a data structure which contains data and may include fields which specify particular properties or characteristics of the data. The term "link" refers to an association between selected nodes. The general usage of the terms "node" and "link" are generally understood in the context of hypertext data structures.

The term "key commands" refers to particular format codes or selected text character(s) or symbol(s) (hidden and not hidden) that are incorporated into a source document as user commands to provide a user generating or editing the source document with the ability to define the logical structure and content of the nodes and the link definitions (i.e., links) when the source document is converted thereto. That is, such key commands are set aside or predefined as user commands, which allow the user to define how the information in the source document is to be copied into a node, specifically the fields of a node. The key commands may also be predefined without the user's knowledge. Such an arrangement provides the user generating the source document with increased ability to define and dictate the structure and information of nodes which represent the source document, through the use of functions or tools already available in document generating application programs, such as hidden text format, bold format and ":" character or symbol, etc.

In view of the foregoing, the present invention is a method and apparatus for generating a searchable hypertext database from source documents. The present invention converts a source document including text and format properties to nodes by analyzing and identifying the format properties of the source document. The source document can then be segmented into representative nodes according to selected format properties, such as by paragraphs (identified by paragraph format codes). The present invention further creates link definitions (i.e., links) that define inter-node associations according to predetermined rules, such as by the hierarchy of the nodes in accordance with the logical structure or hierarchy of the source document as defined by the format properties. In this way, the present invention can create inter-node associations which maintain the logical structure or organization of the original source document. The nodes and link definitions can then be imported and incorporated into a single searchable hypertext database, and viewed and searched on through the use of a hypertext engine or platform.

Figure 1:
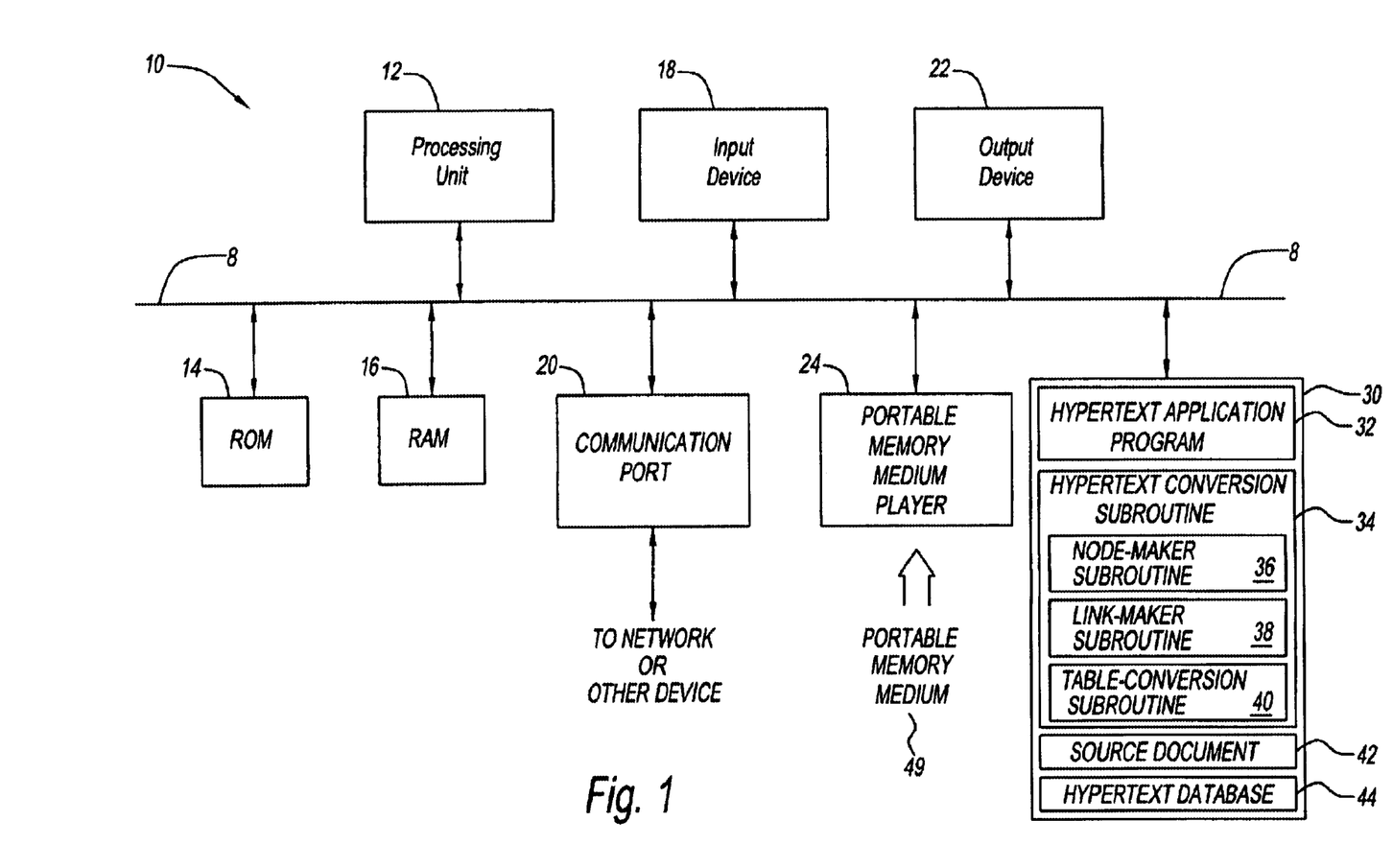
FIG. 1 illustrates a block diagram of an apparatus for converting a source document to nodes and link definitions of a hypertext database, in accordance with the present invention.

FIG. 1 illustrates a device 10 for converting a source document to nodes and link definitions to be imported and incorporated into a hypertext database 44. Device 10 includes a processor unit 12, a random access memory (RAM) 16, a read only memory (ROM) 14, an input device 18 (i.e., a mouse, keyboard, etc.) and an output device 22 (i.e., a display), all of which are known in the art and will not be described in detail herein. Device 10 may also include communication port(s) 20 which provide interconnection to a network or remote devices. A data storage system 30 provides memory capacity for a Hypertext-Conversion Subroutine 34 including a Node-Maker Subroutine 36, a Link-Maker Subroutine 38 and a Table converter 40. Data storage system 30 may also store a Hypertext Application Program 32, i.e., a hypertext platform, tool or engine for searching hypertext database 44. Source document 42 can be retrieved locally from data storage system 30, from a remote storage device, via communication port 20, or from a portable memory medium 50 (e.g., floppy disk, compact disc, etc.), via a portable memory medium player 24. A data bus system 8 coupled between the above-described hardware components of device 10, allows data communication between the different components of device 10.

Hypertext-conversion subroutine 34 in combination with processor unit 12 converts source document 42, including text and format properties, to nodes and link definitions which can then be imported into a hypertext database 44 that can be stored locally as shown or at a remote storage device (via communication port 20). Hypertext-Conversion Subroutine 34 retrieves a source document having at least text and format properties, analyzes the format properties of the source document to identify specific properties, segments the source document based on selected format properties, generates nodes for each segment of the source document according to selected format properties and/or key commands, and generates link definitions which define the inter-node associations (i.e., links) according to predetermined rules. The nodes and link definitions generated by subroutine 34 can be imported into hypertext database 44, and viewed and searched through the use of Hypertext Application Program 32.

Accordingly, various source documents can be converted into a single, searchable, hypertext database that retains the logical structure or hierarchy of the original source documents. Such an arrangement allows source documents to be generated at various locations with different application programs, without the need for additional hardware or training for those generating the source documents. That is, the source documents can be generated in a usual fashion. Thus, the present invention provides a flexible and useful tool for aggregating various information into a logically, searchable database by utilizing the inherent format properties of the source document. For example, a modeling team can analyze information obtained from various sources in an efficient manner to develop models and solutions to pre-specified problems.

Hypertext application program 32 is a hyperlink tool or platform which is employed in combination with processor unit 12 to view and search hypertext database 44 and to create additional node associations as desired, such as by keywords and so forth. An example of such a hyperlink tool is QuestMaph™, developed by Soft Bicycle Company, a corporation of the District of Columbia. Quest Map™ provides a hypertext infrastructure and a rhetorical method for mapping discourse and an approach to facilitating group discussions of complex issues. QuestMap's rhetorical methodology is an Issue-Based Information System (IBIS) that involves making distinctions between issues (i.e., questions), positions (ideas about or possible answers to those questions), and arguments (pros and cons to the positions); and making the appropriate semantic links between icons, or "nodes," that represent these ideas. QuestMap allows the user to create freeform IBIS maps and lists of nodes.

The complexity of QuestMap™'s hypertext tool is hidden from the user, while providing a useful set of functions via an easy-to-use interface. In brief, the features of most importance are the following: (1) the ability to create hyperlinks by copying a node from a map or list and pasting it into another map or list (note that there is, in fact, no copy made, but rather the same node is now present in more than one view); (2) a containing views feature that allows the display of a scrolling list (also a set of hyperlinks) showing all the views (maps or lists) that a particular node is contained in; (3) each node contains a contents window that allows users to enter additional information about the node, including keywords that can be used in searches of the database. (4) a search engine that can display nodes containing certain keywords in scrolling lists, that can then be sorted according to various criteria. The lists are themselves sets of hyperlinks, as users can employ the containing views feature to locate the nodes of interest.

Figure 2:
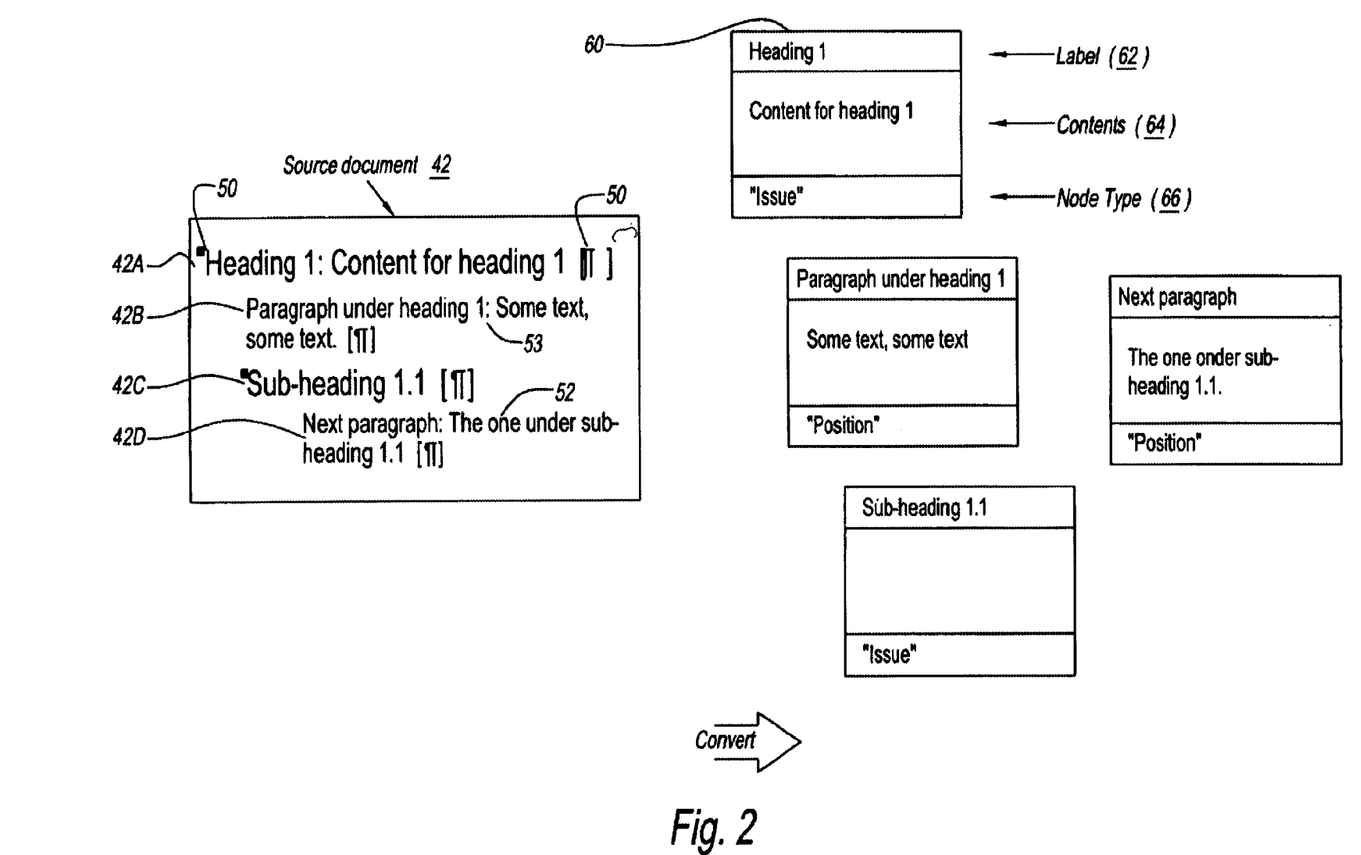
FIG. 2 illustrates an example of generating nodes from a non-hypertext source document in accordance with the present invention.

FIG. 2 illustrates an example of source document 42 which includes textual information and format properties generated from an application program. The text of source document 42 is generally indicated by the reference numeral 52, and the format properties are generally indicated by the reference numeral 50. As shown in FIG. 2, text 52 of source document 42 is arranged in a paragraph format in the following hierarchical manner: (1) a first heading 42A, (2) a paragraph 42B under first heading 42, (3) a sub-heading 1.1 42C and (4) a paragraph 42D under sub-heading 1.1 42C. Each paragraph 42A through 42D is defined by format codes 50, in particular a paragraph format code indicated by the reference symbol [552 ]. Paragraph 42A, 42C is further defined as a heading by format codes 50, i.e., indicated by the reference symbol in combination with [¶]. Note that the characterization of format codes 50 herein, i.e., [¶] and, is merely illustrative to explain the operation of the present invention.

Device 10 in combination with Hypertext-Conversion Subroutine 34 segments source document 42 through the use of format codes 50 and generates nodes 60 for each segment of source document 42. In the preferred embodiment, a node 60 is created for each paragraph 42A through 42D (i.e., a segment) of source document 42 which is identified by format codes 50. Each node 60 includes a plurality of fields which define the subject matter of and other relevant information related to their corresponding segments, such as paragraphs 42A through 42D.

For instance, each node 60 may include a LABEL field 62, a CONTENT field 64 and a NODE TYPE field 66. LABEL field 62 contains content delimited by length or the format codes of source document 42. LABEL field 62 may temporarily contain terms, such as heading, paragraph, heading 1, paragraph 1 and so forth. Such terms define the logical position of node 60 to allow link definitions to be created which define the hierarchical relationship between the nodes to maintain the logical structure of source document 42 (as will be described with reference to FIG. 4). The CONTENT field 64 contains the format codes and the remaining content of the paragraph. The NODE TYPE field 66 contains information referring to the type of information contained in the CONTENT field 64, e.g., an issue or position. The NODE TYPE field 66 contains the term "Issue" if the CONTENT field 64 is a heading; otherwise, NODE TYPE field 66 contains the term "position". Although only three fields are described above, node 60 may include any number of fields to classify the pertinent information in source document 42, depending on the project, problem to be solved or information sought.

Referring still to FIG. 2, source document 42 is also shown as including key commands 53, in this case a colon symbol (":"). Key commands 53 are user entered commands which further define the subject matter and structure of source document 42. Key commands 53 are used in the allocation and insertion of information in the fields of nodes 60, during the conversion process. For instance, in this example, device 10 identifies key commands 53 (":") and causes the text prior to key commands 53 (":") to be copied to the LABEL field 62 and the text after key commands 53 (":") to be copied to the CONTENT field 64. Key commands 53 is described above as a text character (":"), but may also be any text character or symbol (e.g., !, @, #, $, %, ^, and so forth) capable of being generated by an application program.

A user (i.e., a team project member) can generate or edit source document 42 to add key commands 53 to label a portion of source document 42, such as a paragraph, as pertaining to requirements, open issues, action items, or any other type of label, as required. Such key commands 53 may include text as described herein or format codes (to be described below with reference to FIG. 3). For instance, this can be accomplished in several ways, for instance, by pressing buttons corresponding to a key command 53 in a Microsoft Word™ template or manually entering key commands 53 into the document. Such an arrangement does not require any additional hardware or reprogramming of the application program used to generate source document 42.

Figure 3:
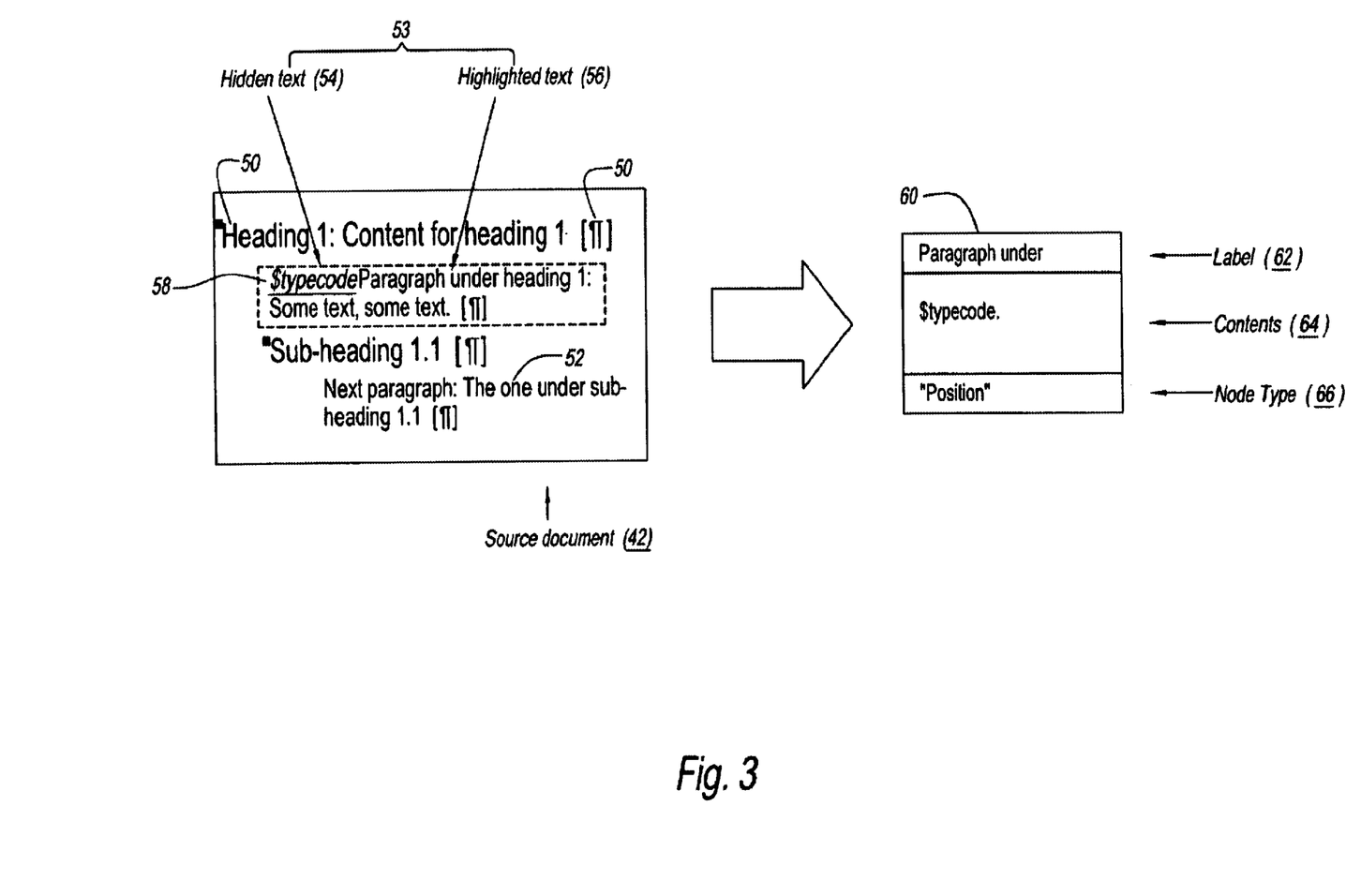
FIG. 3 illustrates an alternative embodiment of utilizing user encoded key-words or characters to format a node.

FIG. 3 illustrates another example of source document 42 which includes user selected key commands 53 that are in the form of format codes, such as hidden text format code 54 and bold format code 56, instead of text character(s) or symbol(s) as described in FIG. 2. In this embodiment, a segment such as a paragraph denoted by the reference numeral 58 has been encoded with user selected key commands 54 and 56, in this case, a hidden text format code and a highlight or bold text format code, respectively, through the use of functions typically provided by conventional application programs. In general, during conversion of source document 42 to such nodes 60, device 10 is configured to identify such key commands 54 and 56 of segment 58 and to generate nodes 60 according to key commands 54 and 56. For example, in this case, device 10 causes highlighted text associated with key command 56 (e.g., text delimited by the key command) to be copied into the LABEL field 62. The hidden text associated with key command 54 is copied into the CONTENT field 64, and the term "Position" is inserted into NODE TYPE field 66 since segment 58 is not a heading.

Figure 4:
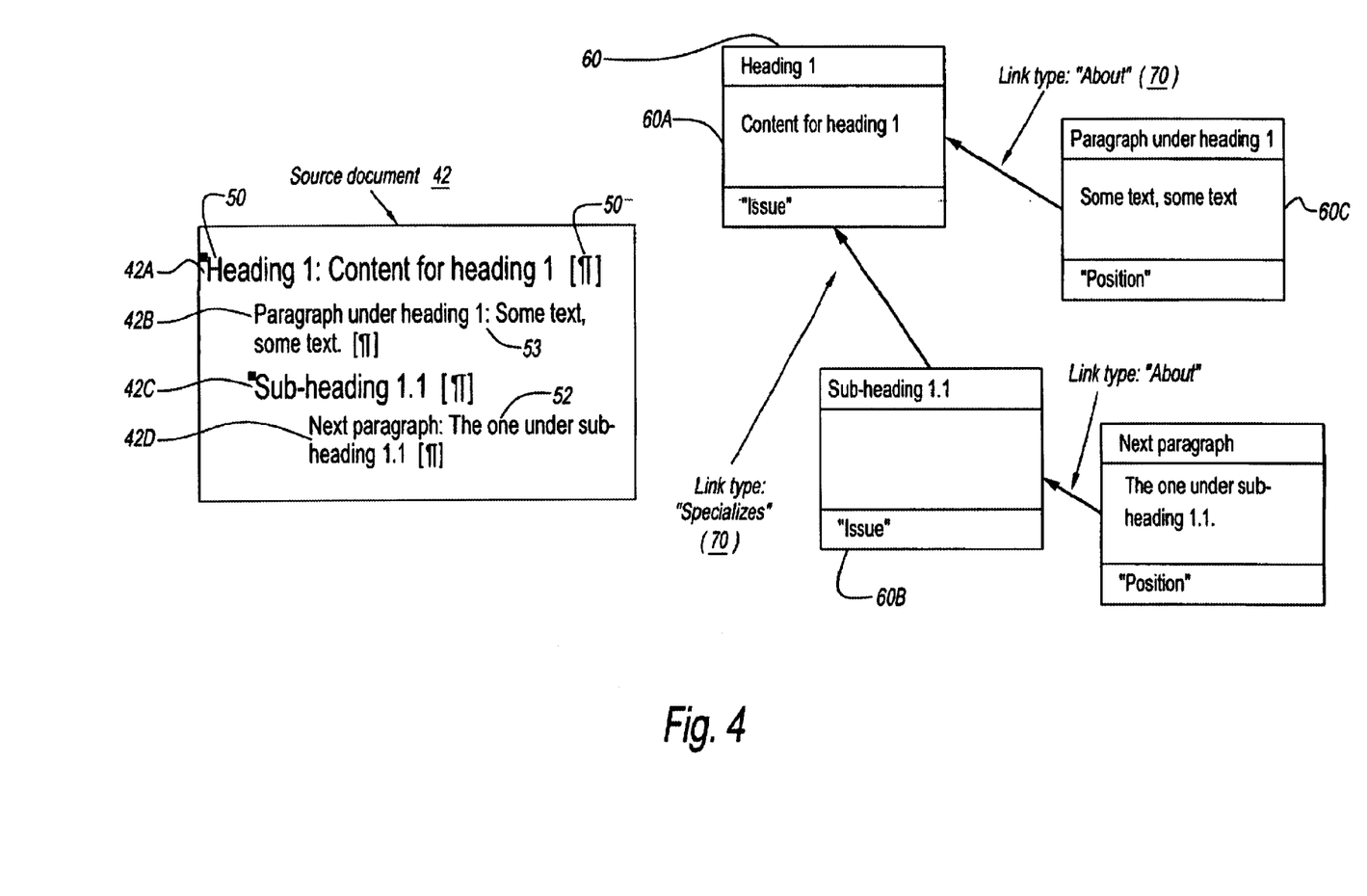
FIG. 4 illustrates an example of generating link definitions between the nodes of FIG. 2 in accordance with the present invention.

Referring to FIG. 4, there is shown an example of generating link definitions between nodes 60 to maintain the logical structure or hierarchy of source document 42. In particular, once nodes 60 are generated (as shown in FIG. 2), processor unit 12 in combination with Link-Maker Subroutine 38, counts and records the number of generated nodes 60, and assigns a unique identifier to each node 60. Link definitions 70 (i.e., links) are then generated for nodes 60 by analyzing format properties of source document 42 to determine the relationship between each node 60 in order to create inter-node associations that maintain the logical structure or hierarchy of the content (e.g., text) of source document 42. Once the logical relationship of each node 60 is ascertained, link definitions 70 can be generated accordingly by associating nodes 60 to each other, using their unique identifiers. As shown in FIG. 4, link definitions 70 create inter-node associations between nodes 60 that reflect the logical or hierarchical structure of source document 42.

Moreover, the links or link definitions may be further defined or typed ("link-typed") according to a logical relationship between the content (particularly, the ideas, information or subject matter of the content) contained in the linked nodes so as to confer the ideas contained in each node relative to other nodes. The link-typing approach of the present invention analyzes the format codes (e.g., identifies headings, subheadings and non-heading paragraphs, etc.) to define automatically interrelationships between different nodes according to the information contained in the nodes (e.g., the text). More specifically, the link-typing approach defines the relationship between linked nodes according to the logical relationship between the subject matter of the content contained in the linked nodes, such as whether the content of a node explains (e.g., "About") or further defines (e.g., "Specializes") the subject matter maintained in the other linked node.

As shown in an example provided in FIG. 4, a link or link definition 70 may be link-typed as "Specializes" or "About" according to the format codes or properties of source document 42. The link-type "Specializes" generally indicates that the content of a node 60B is a subtopic of the information of a node 60A (e.g., such as a subheading). The link-type "About" generally indicates that the content of a node 60C explains the subject matter of the node 60A (e.g., such as a paragraph under a heading). Although only two link-types are illustrated in FIG. 4, the present invention may employ a variety of link-types to define different types of relationships between the nodes, so long as such relationships may be identified through the use of the format codes, key commands or like of the source document. For example, link-types may be employed depending on desired search parameters, the relationships or information sought to be identified, and so forth.

Accordingly, the link-typing approach of the present invention allows inter-node relationships to be further defined, particularly according to the logical relationship of the content maintained in the nodes. This can be accomplished by analyzing the format code, key commands or the like of a source document to determine the logical relationship (e.g., a heading, subheading, non-heading paragraph, etc.), and link-typing the nodes accordingly. Such an approach provides a hypertext database that allows nodes to be searched according to the logical relationship of the content contained in the nodes and, thus, provides a useful tool.

Figure 5:
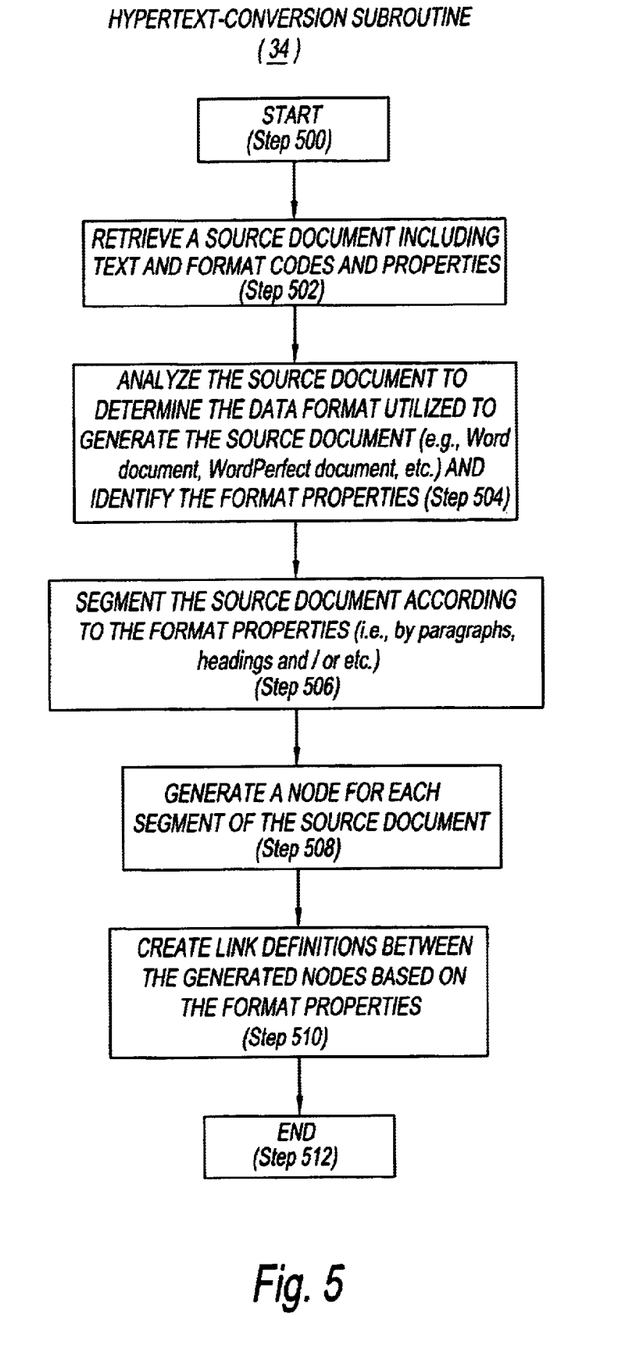
FIG. 5 illustrates a flow chart of a Hypertext-Conversion subroutine for generating nodes and link definitions from a source document according to the format properties or codes of the source document.

FIG. 5 illustrates an example of Hypertext-Conversion Subroutine 34 of the present invention. Initially, a source document 42 is generated by an individual, such as a project team member, using an application program. Hypertext-Conversion Subroutine 34 is then initiated to convert source document 42 to nodes 60 and link definition 70 (Step 500). Source document 42 is retrieved, i.e., either locally or remotely, and includes text, format properties and key commands (Step 502). Source document 42 is then analyzed to determine the data format utilized to generate the source document (e.g., which application program was utilized to generated the source document), and the format properties of source document 42 are identified (Step 504). Source document 42 is then segmented according to selected format properties, i.e., by paragraphs, headings and/or other format properties (Step 506). A node 60 is then generated for each segment of source document 42 through the use of Node-Maker Subroutine 36 (Step 508). Link-Maker Subroutine 38 is employed to create link definitions between generated nodes 60, based on predefined rules, such as by hierarchy of source document 42, key commands 53 and so forth by analyzing the format properties (Step 510). Once nodes 60 and link definitions 70 have been generated, Hypertext-Conversion Subroutine 34 terminates (Step 512), nodes 60 and link definitions 70 can be stored in a file, e.g., "nodes.txt", and imported into hypertext database 44.

Figure 6:
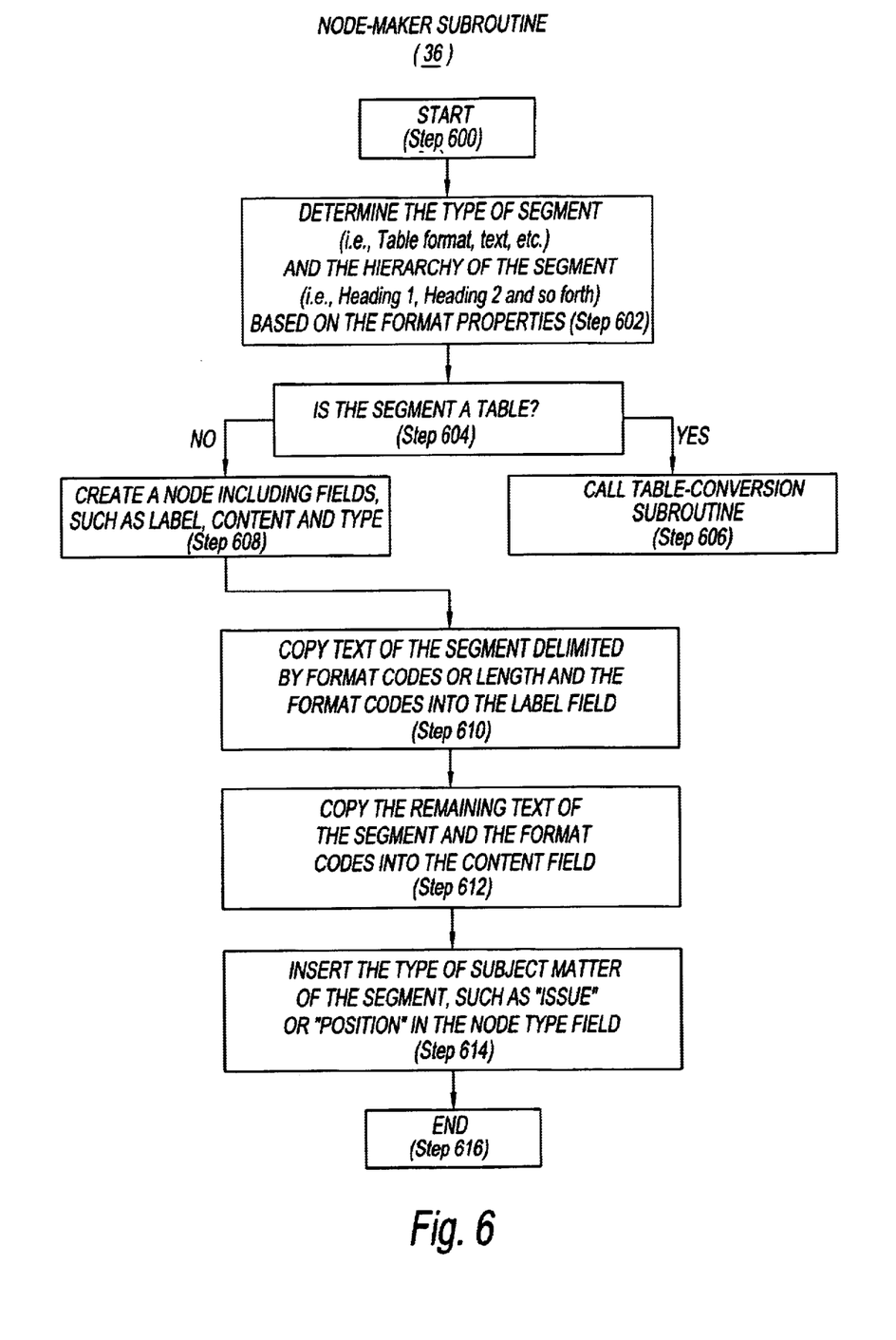
FIG. 6 illustrates a flow chart of a first embodiment of a Node-Maker Subroutine for creating a node.

FIG. 6 illustrates a first embodiment of Node-Maker Subroutine 36, which creates a node 60 for each segment of source document 42. Once source document 42 is segmented, Node-Maker Subroutine 36 is initiated to generate nodes for each segment of source document 42 (Step 600). Node-Maker subroutines 36 initially determines the type of a segment, i.e., a table format, text, etc., and the hierarchy of the segment (i.e., heading 1, sub-heading 1, etc.) in the logical structure of source document 42, based on the format properties (Step 602). If the segment is in a table format (Step 604), Table-Conversion Subroutine 40 is initiated to convert the table to nodes 60 (as described in FIG. 8) (Step 606). Otherwise, a node is created with fields, such as the LABEL field 62, the CONTENT field 64 and the NODE TYPE field (Step 608). A general indication of the hierarchy of a segment (e.g., heading 1, sub-heading 1, etc.) may be temporarily maintained in a field of the segment and used to create inter-node associations (links or link definitions).

In this embodiment, the LABEL field 62 has inserted therein preferably the content (e.g., text) delimited by length or format codes (e.g., highlight codes)(Step 610). The format codes and the remaining content is copied into the CONTENT field 64 (Step 612). The type of subject matter of the segment is inserted in the NODE TYPE field (Step 614). For instance, a node can be typed as an "Issue" or "Position" through the use of the format properties, where "Issue" refers to a topic and "Position" refers to information relating or explaining a topic. That is, a node 60 has the term "Issue" in the TYPE field if the corresponding segment is a heading (i.e., contains a heading format code). Otherwise, the TYPE field has the term "Position". Steps 602 through 614 are performed for each segment of source document 42 until all segments are represented by corresponding nodes 60. Node-Maker Subroutine 36 terminates upon generation of all nodes 60 (Step 616). It should be understood that information can be entered in the fields of node 60 in any order.

Figure 7:
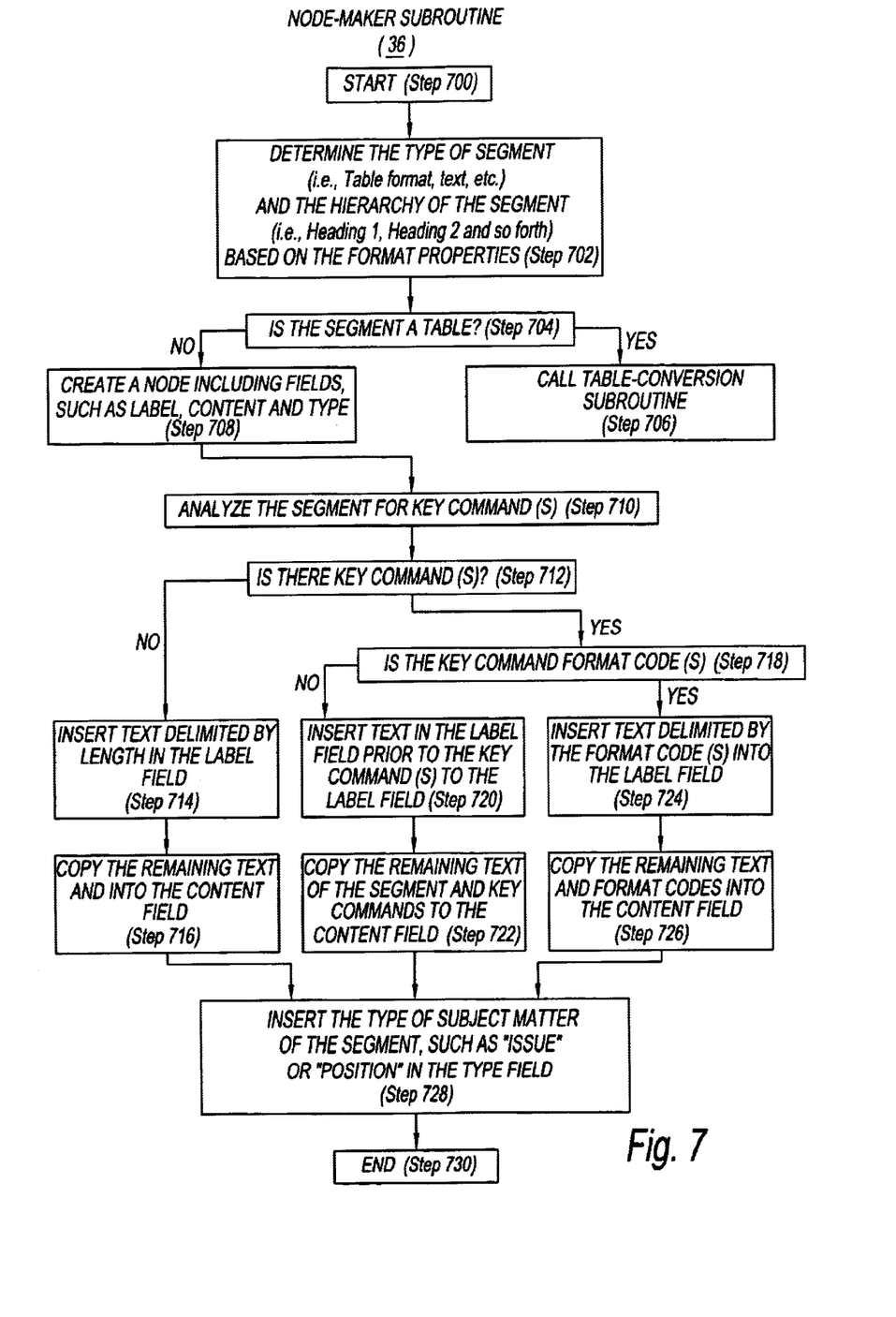
FIG. 7 illustrates a flow chart of a second embodiment of a Node-Maker Subroutine for creating a node.

FIG. 7 illustrates a second embodiment of Node-Maker Subroutine 36 which utilizes User key commands 53 in source document 42 to create corresponding nodes 60 for each segment of the source document. Key commands 53 can take the form of predefined text character(s) or symbol (s), such as ":", or format codes, such as hidden text code and highlighted text code. For instance, once source document 42 is segmented, Node-Maker Subroutine 36 is initiated to generate nodes for each segment of source document 42 (Step 700). Node-Maker Subroutine 36 determines the type of the segment, i.e., a table format, text, etc., and the hierarchy of the segment, i.e., heading 1, sub-heading 1, etc., based on selected format properties of source document 42 (Step 702). If the segment is in a table format (Step 704), Table-Conversion Subroutine 40 is initiated to convert the table to nodes 60 (Step 706). Otherwise, a node 60 is created with fields, such as the LABEL field 62, the CONTENT field 64 and the TYPE field 66 (Step 708). The segment is then analyzed for key commands 53 (Step 710). If no key commands 53 are found, node 60 is generated in the same manner as described in FIG. 6 (Steps 714, 716 and 730).

If key commands 53 are found, subroutine 36 configures node 60 according to key commands 53, which cause subroutine 36 to copy or insert information into the fields of nodes 60 in a predetermined manner. For instance, if key command 53 is a text character (":") as shown in FIG. 2 (Step 718), the text delimited by the key command 53 (e.g., a portion of the segment prior to the key command) is copied to the LABEL field 62 (Step 720). The key command 53 and the remaining text of the segment (e.g., after the key command) are copied to the CONTENT field 64 (Step 722). The type of subject matter of the segment, such as an "Issue" or "Position" is inserted in the TYPE field 66 (Step 728). For instance, a segment has "Issue" in the TYPE field if the segment is a heading. Otherwise, the TYPE field has "Position".

Alternatively, if key commands 53 are predetermined format codes, such as hidden text format code and highlighted (bold) text format code, then the text delimited by the key commands (e.g., the hidden text) is copied to the LABEL field (Step 724). The key commands 53 and the remaining highlighted text are copied to the CONTENT field (step 726). The type of subject matter of the segment, such as an "Issue" or "Position" is inserted in the TYPE field, as described above (step 728).

In any event, steps 702 through 728 are performed for each segment of source document 42 until all segments are represented by corresponding nodes 60. Node-Maker Subroutine 36 terminates upon generation of all nodes 60 (Step 730).

It should be understood that Node-Maker Subroutine 36 can be configured to generate nodes in any desired manner using the format properties and/or key commands of source document 42. For instance, nodes 60 can be generated using only the format properties of source document 42. The present invention also allows source documents 42 to be pre-formatted with user key commands 53 which are later used during the conversion process to specify the allocation of information of source document 42 into the fields of nodes 60. As can be appreciated, such an arrangement provides a useful tool to create nodes and link definitions of a searchable hypertext database from source documents that are generated from a wide variety of locations and application programs. Such source documents 42 can be encoded (i.e., key commands 53) using functions already available on conventional application programs.

Figure 8:
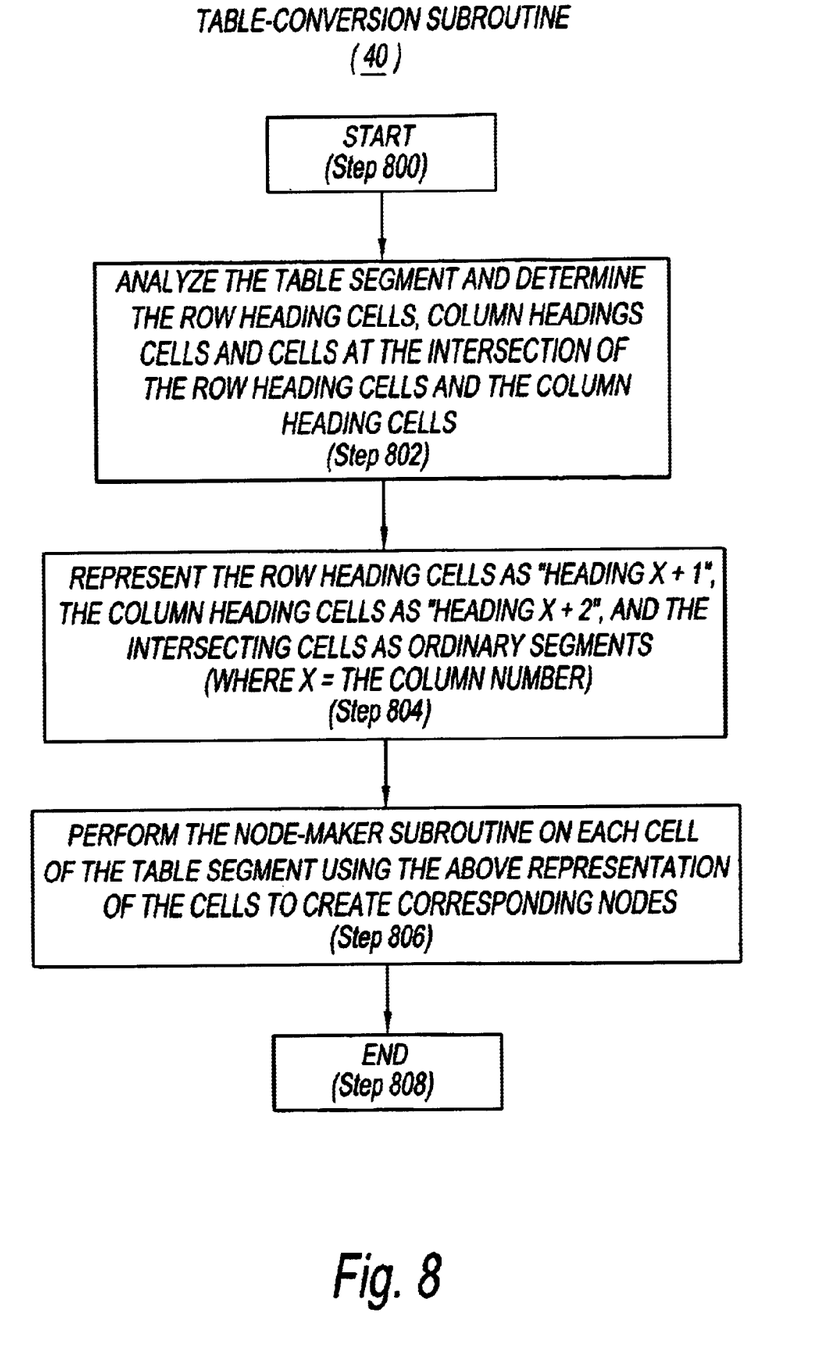
FIG. 8 illustrates a flow chart of a Table Conversion Subroutine for converting a table into a node.

Referring to FIG. 8, there is provided a flow diagram of Table-Conversion Subroutine 40. Table-Conversion Subroutine 40 is initiated to convert a segment of source document 42 in a table format to nodes 60 (Step 800). Table-Conversion Subroutine 40 analyzes the table segment and table format codes (Step 802) and represents the row heading as "Heading x +1" nodes (where x=the column number) and the column headings as "Heading x +2" nodes that repeat after every "Heading 2" node (Step 804). The table cells at the intersection of the row and column headings are treated as normal paragraph segments following the appropriate "Heading x+2" nodes (Step 804). In this way, nodes 60 may be generated in a similar manner as described for Node-Maker Subroutine 34 for each row heading cell, column heading cell and table cell at the intersection of the row and column heading (Step 806). In particular, the LABEL field 62 of each node 60 would contain the content delimited by length or key commands or format code, the CONTENT field 64 would contain the remaining content in the cell and the key commands or format codes, and the NODE TYPE field 66 would contain the term "Issue" or "Position". Once all nodes 60 are generated for the table segment, Table-Conversion Subroutine 40 is terminated (Step 808).

It should be understood that tables as well as other configurations of data of source document 42, such as charts, spreadsheets, etc., can also be converted to a node representation, in accordance with the concept of the present invention.

Figure 9:
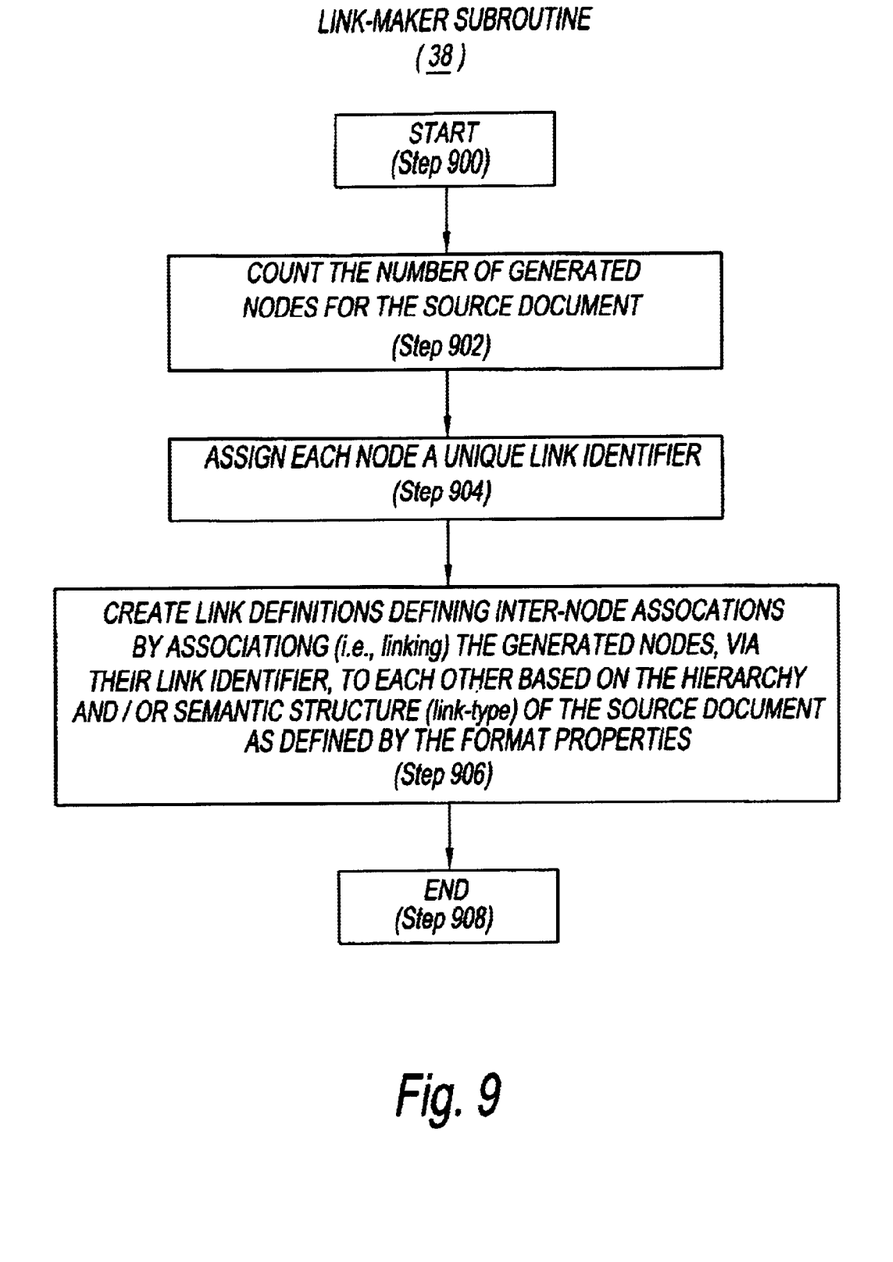
FIG. 9 illustrates a flow chart of a Link-Maker Subroutine for creating inter-node associations.

FIG. 9 illustrates an example of Link-Maker Subroutine 38 for creating link definitions 70. Once Node-Maker Subroutine 36 has generated all nodes 60 from source document 42, Link-Maker Subroutine 38 is initiated to create link definitions 70, which creates inter-node associations between nodes 60 generated by Node-Maker Subroutine 36 (Step 900). Link-Maker Subroutine 38 counts and records the number of generated nodes 60 (Step 902) and then assigns each node 60 a unique link identifier (Step 904). Thereafter, Link-Maker Subroutine 38 creates link definitions 70 or, in other words, links, defining the inter-node associations between nodes 60. Link-Maker Subroutine 38 may also link-type such link definitions 70 to define further desired relationships between linked nodes.

In the preferred embodiment, nodes 60 are associated, via their unique link identifiers, based on the logical structure or hierarchy of the nodes as defined by the format properties of source document 60. For instance, as shown in FIG. 4, paragraph 42B is linked to paragraph 42A to maintain the logical hierarchical structure of source document 42, so that nodes 60 can be searched or viewed in the same manner as if source document 42 itself is being viewed. Nodes 60 may also be associated based on the logical relationship of the content contained in the nodes, via link-typing. It should be understood that the creation of link definitions 70 and link-types are governed by user predefined rules, such as having nodes 60 linked according the logical structure of source document 42 (as described above), according to key commands 53 (i.e., nodes 60 corresponding to segments with specific key commands are to be linked), and so forth.

In any event, once link definitions 70 have been generated, Link-Maker Subroutine 38 is terminated (Step 908) and nodes 60 and link definitions 70 can be imported into hypertext database 44. Hypertext database 44 can then be accessed and searched using hypertext application program 32, such as Quest Map™ (as described above). Hypertext application Program 32 can also be employed to create additional node associations, i.e., according to keywords, information in particular fields, and so forth.

Figure 10:
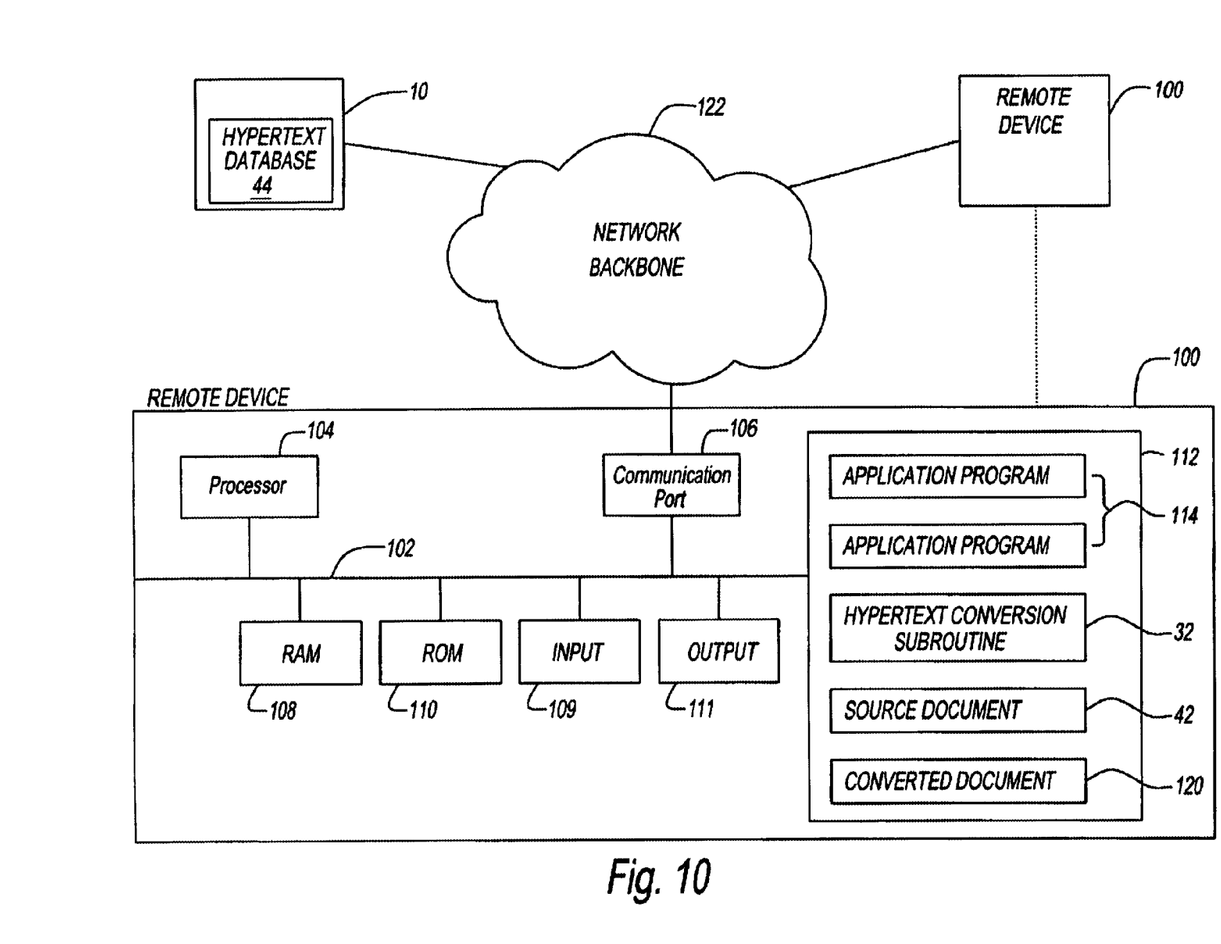
FIG. 10 is a system architecture of the present invention for retrieving source documents or a converted source document file including nodes and link definitions to generate a single searchable hypertext database.

Referring to FIG. 10, there is shown a system overview of the present invention which includes at least one remote device 100 for generating source document 42 connected to device 10 (FIG. 1), across a network backbone 122. Remote device 100 includes a processor unit 104, a random access memory (RAM) 108, a read only memory (ROM) 110, an input device 109 (i.e., a mouse, keyboard, etc.) and an output device 111 (i.e., a display), all of which are known in the art and will not be described in detail herein. A data storage system 112 provide memory capacity for at least one application program 114 to generate source document 42. Data storage system 112 may also store Hypertext-Conversion Subroutine 34 to convert source document 42 to nodes 60 and link definitions 70 which are stored as a data file generally indicated as converted document 120. A data bus system 102 coupled between the above-described hardware components of remote device 100 allows data communication between the different components of remote device 100. Remote device 100 also includes communication port(s) 106 which provide interconnection to network 122. Therefore, device 10 can retrieve source document 42 or converted document 120 from remote device 100, across network 122.

In an operational example of the present invention, an individual, such as a project team member, generates or edits source document 42 (including format properties 50) using conventional application programs, locally or at a remote site. The individual may selectively insert key commands 53 into source document 42, during the above process. Thereafter, device 10 retrieves source document 42 and converts source document 42 to nodes 60 and link definitions 70, according to format properties 50 and/or key commands 53. Nodes 60 and link definitions 70 can then be imported and incorporated into a searchable hypertext database 44. It should be understood that any number of source documents 42 can be converted and imported into hypertext database 44.

In summary, the present invention provides a useful tool for aggregating and organizing a variety of information that is generated using various application programs, into a single searchable database. More specifically, the present invention provides a flexible tool for aggregating and organizing various information into a logically, searchable database by utilizing the inherent format properties and/or user key commands of the source document. For example, from a modeling perspective, a modeling team can thus analyze information obtained from various sources in an efficient manner to develop models and solutions to pre-specified problems.

The invention having thus been described with particular reference to the preferred forms thereof, it will be obvious that various changes and modifications may be made therein without departing from the spirit and scope of the invention as defined in the appended claims.

What is claimed is:

1. A method for creating a node definition for a hypertext database from a document, said method comprising the steps of:
   (a) analyzing a document to identify a format property of a first segment of said document;
   (b) determining a semantic function of information in said first segment based on said format property;
   (c) generating a first node for said first segment, wherein said first node includes a field for representing a characteristic of said first segment; and
   (d) assigning a node type to said first node based on said semantic function.

2. The method as recited in claim 1, wherein said format property comprises a paragraph format code that identifies a paragraph of said document.

3. The method as recited in claim 1, further comprises inserting data into said field based on said format property.

4. The method as recited in claim 3,
   wherein said document includes a key command that represents said format property, and
   wherein said data is based on said key command.

5. The method as recited in claim 3, wherein said data comprises text associated with said first segment.

6. The method as recited in claim 3, wherein said data is selected from the group consisting of a format code, a key command and text associated with said first segment.

7. The method as recited in claim 1, wherein said field characterizes a subject matter of said first segment.

8. The method as recited in claim 1, further comprising, prior to said step (a), the step of generating said document to include text and said format property.

9. The method as recited in claim 8, wherein said step of generating said document comprises including a user-defined key command in said document.

10. The method as recited in claim 9, wherein said method further comprises inserting data into said field in accordance with said key command.

11. The method as recited in claim 9, wherein said key command is in a form selected from the group consisting of text characters and format codes.

12. The method as recited in claim 1, wherein step (a) includes the step of analyzing a format code of said document to identify said format property.

13. The method as recited in claim 1, further comprising the step of importing said first node into the hypertext database.

14. The method as recited in claim 1, further comprising assigning an identifier to each of said first node and a second node and associating said first node and said second node through said identifiers.

15. The method as recited in claim 1, further comprising:
   determining a semantic relationship between information contained in said first segment and information contained in a second segment of said document;
   creating a link to establish an association between said first node and a second node that corresponds to said second segment; and
   assigning a link type to said link based on said semantic relationship.

16. The method of claim 15, wherein said link type is selected from the group consisting of (a) specializes and (b) about.

17. The method as recited in claim 1, further comprising the step of retrieving said document from a storage device.

18. The method of claim 1,
   wherein said document is a first document, and
   wherein said method further comprises:
      determining a semantic relationship between information contained in said first segment and information contained in a second segment in a second document;
      creating a link to establish an association between said first node and a second node that corresponds to said second segment; and
      assigning a link type to said link based on said semantic relationship.

19. The method of claim 1, wherein said node type is selected from the group consisting of (a) issue and (b) position.

20. An apparatus for converting a document to nodes of a hypertext database, said apparatus comprising:
   means for retrieving a document that contains text in a logical organization;
   processing means, coupled to said retrieving means, for:
      (a) analyzing said document to identify a format property of a first segment of said document;
      (b) determining a semantic function of information in said first segment based on said format property;
      (c) generating a first node for said first segment, wherein said first node includes a field for representing a characteristic of said first segment; and
      (d) assigning a node type to said first node based on said semantic function.

21. The apparatus as recited in claim 20, wherein said processing means inserts data in said field, in accordance with said format property.

22. The apparatus as recited in claim 20,
   wherein said document further includes a key command, and
   wherein said processing means inserts data into said field, in accordance with said key command.

23. The apparatus as recited in claim 20,
   wherein said processing means is also for:
      determining a semantic relationship between information contained in said first segment and information contained in a second segment of said document;
      creating a link to establish an association between said first node and a second node that corresponds to said second segment; and
      assigning a link type to said link based on said semantic relationship.

24. The apparatus of claim 23, wherein said link type is selected from the group consisting of (a) specializes and (b) about.

25. The apparatus as recited in claim 23, wherein said processing means further includes means for importing said first node and said link into the hypertext database.

26. The apparatus as recited in claim 25, wherein said processing means further includes means for searching the hypertext database for said first node, via said link.

27. The method of claim 20, wherein said node type is selected from the group consisting of (a) issue and (b) position.

28. The apparatus of 20,
   wherein said document is a first document, and
   wherein said method further comprises:
      determining a semantic relationship between information contained in said first segment and information contained in a second segment in a second document;

creating a link to establish an association between said first node and a second node that corresponds to said second segment; and assigning a link type to said link based on said semantic relationship.

29. The apparatus of claim 28, wherein said link type is selected from the group consisting of (a) specializes and (b) about.

30. A system for converting a document to nodes and links of a hypertext database, said system comprising:

means for generating a document that contains information in a logical organization;

storage means for storing said document;

means, coupled to storage means, for retrieving said document; and processing means, coupled to said means for retrieving, for:
 (a) analyzing said document to identify a first format property of a first segment of said document and a second format property of a second segment of said document;
 (b) determining a semantic relationship between information in said first segment and information in said second segment based on said first format property and said second format property;
 (c) generating a first node for said first segment and a second node for said second segment, wherein said first node includes a field for representing a characteristic of said first segment;
 (d) creating a link to establish an association between said first node and said second node; and
 (e) assigning a link type to said link based on said semantic relationship.

31. The system as recited in claim 30, wherein said means for generating said document includes user means for encoding said document with said first format property and said second format property.

32. The system as recited in claim 30, wherein said processing means inserts data into said field, in accordance with said first format property.

33. The system as recited in claim 30, wherein said document further includes a key command, and wherein said processing means inserts data into said field, in accordance with said key command.

34. The system as recited in claim 33, wherein said means for generating said document further includes user means for encoding said document with said key command.

35. The system as recited in claim 30, wherein said processing means further includes means for importing said first node and said link into the hypertext database.

36. The system as recited in claim 30, wherein said processing means further includes means for searching the hypertext database for said first node, via said link.

37. The system as recited in claim 30, wherein said means for generating said document is coupled to said processing means, across a network.

38. The system as recited in claim 30, wherein said means for retrieving retrieves said document from a portable memory storage device.

39. The system of claim 30, wherein said link type is selected from the group consisting of (a) specializes and (b) about.

40. The system of claim 30, wherein said document is a first document, wherein said semantic relationship is a first semantic relationship, wherein said link is a first link, wherein said link type is a first link type, and wherein said method further comprises:

determining a second semantic relationship between information contained in said first segment and information contained in a third segment in a second document;

creating a second link to establish an association between said first node and a third node that correspond to said third segment; and assigning a second link type to said link based on said second semantic relationship.

41. The system of claim 40, wherein said second type is selected from the group consisting of (a) specializes and (b) about.

42. A method for creating a node and a link for a hypertext database from a document, said method comprising the steps of:
 (a) analyzing a document to identify a first format property of a first segment of said document and a second format property of a second segment of said document;
 (b) determining a semantic relationship between information in said first segment and information in said second segment based on said first format property and said second format property;
 (c) generating a first node for said first segment and a second node for said second segment, wherein said first node includes a field for representing a characteristic of said first segment;
 (d) creating a link to establish an association between said first node and said second node; and
 (e) assigning a link type to said link based on said semantic relationship.

* * * * *